United States Patent
Schwartz et al.

(10) Patent No.: US 12,374,935 B2
(45) Date of Patent: *Jul. 29, 2025

(54) METHODS AND CIRCUITRY FOR MITIGATING SATURATION IN WIRELESS POWER SYSTEMS

(71) Applicant: Apple Inc., Cupertino, CA (US)

(72) Inventors: Adam L. Schwartz, Redwood City, CA (US); Alireza Safaee, San Jose, CA (US); Stephen C. Terry, San Jose, CA (US); Zhiyuan Hu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,598

(22) Filed: Apr. 2, 2024

(65) Prior Publication Data

US 2024/0250561 A1     Jul. 25, 2024

Related U.S. Application Data

(63) Continuation of application No. 18/336,555, filed on Jun. 16, 2023, now Pat. No. 11,984,737, which is a
(Continued)

(51) Int. Cl.
*H02J 50/70* (2016.01)
*H01F 27/36* (2006.01)
(Continued)

(52) U.S. Cl.
CPC .............. *H02J 50/70* (2016.02); *H01F 27/36* (2013.01); *H01F 38/14* (2013.01); *H02J 7/02* (2013.01);
(Continued)

(58) Field of Classification Search
CPC .... H02J 50/70; H02J 7/02; H02J 50/12; H02J 50/60; H02J 50/40; H02J 50/80;
(Continued)

(56) References Cited

U.S. PATENT DOCUMENTS

| 8,565,165 B2 | 10/2013 | Ise et al. |
| 9,258,767 B2 | 2/2016 | Park |

(Continued)

FOREIGN PATENT DOCUMENTS

| CN | 104167830 A | 11/2014 |
| CN | 106059109 A | 10/2016 |

(Continued)

OTHER PUBLICATIONS

First Office Action of CN Application No. 2023113927039 dated Jul. 21, 2024; 7 pages.

(Continued)

*Primary Examiner* — Daniel Kessie
*Assistant Examiner* — Terrence R Willoughby
(74) *Attorney, Agent, or Firm* — FLETCHER YODER PC

(57) ABSTRACT

A wireless charging system having a power transmitter may wirelessly transfer power to a power receiver. Shield saturation, such as saturation of a ferrite structure, in the wireless power receiver may occur under some operating conditions. Saturation can lead to disruptive oscillations in power transfer. The power transmitting may include control circuitry for detecting and mitigating saturation.

30 Claims, 11 Drawing Sheets

Related U.S. Application Data continuation of application No. 17/198,116, filed on Mar. 10, 2021, now Pat. No. 11,735,962.

(60) Provisional application No. 63/143,704, filed on Jan. 29, 2021.

(51) Int. Cl.
  *H01F 38/14* (2006.01)
  *H02J 7/02* (2016.01)
  *H02J 50/12* (2016.01)
  *H02J 50/60* (2016.01)
  *H02M 1/40* (2007.01)

(52) U.S. Cl.
  CPC .............. *H02J 50/12* (2016.02); *H02J 50/60* (2016.02); *H02M 1/40* (2013.01)

(58) Field of Classification Search
  CPC ........ H01F 27/36; H01F 38/14; H01F 27/361; H02M 1/40
  See application file for complete search history.

(56) References Cited

U.S. PATENT DOCUMENTS

| | | | |
|---|---|---|---|
| 9,642,171 | B2 | 5/2017 | Abraham et al. |
| 10,601,250 | B1 | 3/2020 | Oh et al. |
| 2013/0307468 | A1 | 11/2013 | Lee |
| 2014/0035364 | A1 | 2/2014 | Uramoto et al. |
| 2014/0337633 | A1 | 11/2014 | Yang et al. |
| 2014/0337950 | A1 | 11/2014 | Yange et al. |
| 2015/0097442 | A1 | 4/2015 | Muurinen |
| 2015/0115723 | A1 | 4/2015 | Levo et al. |
| 2015/0123602 | A1* | 5/2015 | Patino ..................... H02J 50/60 320/108 |
| 2015/0244341 | A1 | 8/2015 | Ritter et al. |
| 2018/0323648 | A1 | 11/2018 | Joye |
| 2019/0020221 | A1 | 1/2019 | Louis |
| 2019/0311839 | A1 | 10/2019 | Rump et al. |
| 2019/0393727 | A1 | 12/2019 | Yoon |
| 2020/0212725 | A1 | 7/2020 | Van Wageningen et al. |
| 2020/0217875 | A1 | 7/2020 | Li et al. |
| 2022/0140664 | A1* | 5/2022 | Dearden ................. H02J 50/80 307/104 |

FOREIGN PATENT DOCUMENTS

| | | |
|---|---|---|
| CN | 106062906 A | 10/2016 |
| CN | 206230126 U | 12/2016 |
| CN | 109690903 A | 4/2019 |
| CN | 111817451 A | 10/2020 |
| DE | 102018212680 A | 1/2020 |
| EP | 3606284 A1 | 2/2020 |
| JP | H11089119 A | 3/1999 |
| JP | 2005237166 A | 9/2005 |
| JP | 2011211863 A | 10/2011 |
| JP | 2014030288 A | 2/2014 |
| JP | 2017506485 A | 3/2017 |
| JP | 2020522222 A | 7/2020 |
| KR | 1020160117587 A | 10/2016 |
| WO | 2015112029 A1 | 7/2015 |
| WO | 2018031547 A1 | 2/2018 |

OTHER PUBLICATIONS

Notification to Grant for Chinese Patent Application No. 202311392703.9 dated Dec. 27, 2024; 6 pgs.

* cited by examiner

METHODS AND CIRCUITRY FOR MITIGATING SATURATION IN WIRELESS POWER SYSTEMS

This application is a continuation of U.S. patent application Ser. No. 18/336,555, filed Jun. 16, 2023, which is a continuation of U.S. patent application Ser. No. 17/198,116, filed Mar. 10, 2021, which claims the benefit of U.S. Provisional Patent Application No. 63/143,704, filed Jan. 29, 2021, all of which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a battery-powered, portable electronic device. The wireless power transmitting device has a coil that produces electromagnetic flux. The wireless power receiving device has a coil and rectifier circuitry that uses electromagnetic flux produced by the transmitter to generate direct-current power that can be used to power electrical loads in the battery-powered portable electronic device. It can be challenging to design a wireless charging system.

DETAILED DESCRIPTION

A wireless power system includes a wireless power transmitting device. The wireless power transmitting device wirelessly transmits power to one or more wireless power receiving devices. The wireless power receiving devices may include electronic devices such as wristwatches, cellular telephones, tablet computers, laptop computers, ear buds, battery cases for ear buds and other devices, tablet computer styluses (pencils) and other input-output devices, wearable devices, or other electronic equipment. The wireless power transmitting device may be an electronic device such as a wireless charging mat or puck, a tablet computer or other battery-powered electronic device with wireless power transmitting circuitry, or other wireless power transmitting device. The wireless power receiving devices use power from the wireless power transmitting device for powering internal components and for charging an internal battery. Because transmitted wireless power is often used for charging internal batteries, wireless power transmission operations are sometimes referred to as wireless charging operations.

Figure 1A:
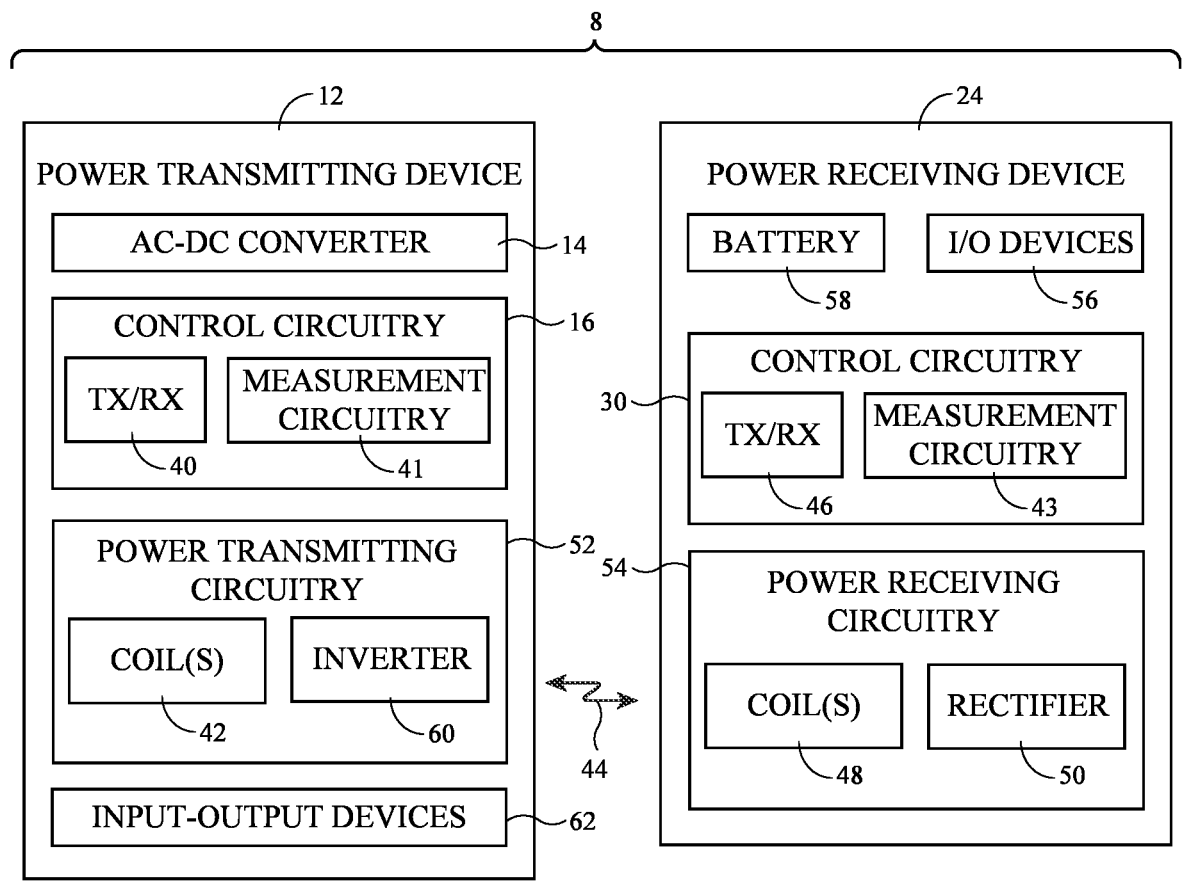
FIG. 1A is a block diagram of an illustrative wireless charging system that includes a wireless power transmitting device and a wireless power receiving device in accordance with some embodiments.

An illustrative wireless power system, sometimes referred to as a wireless charging system, is shown in FIG. 1A. As shown in FIG. 1A, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitries in system 8 such as control circuitry 16 and control circuitry 30 are used in controlling the operation of system 8. This control circuitry may include processing circuitry associated with microprocessors, power management units, baseband processors, application processors, digital signal processors, microcontrollers, battery chargers, and/or application-specific integrated circuits with processing circuits. The processing circuitry implements desired control and communications features in devices 12 and 24.

For example, the processing circuitry may be used in selecting wireless power coils, determining power transmission levels, processing sensor data and other data, processing user input, handling negotiations between devices 12 and 24, sending and receiving in-band and out-of-band data, making measurements, and otherwise controlling the operation of system 8. As another example, the processing circuitry may include one or more processors such as an application processor that is used to run software such as internet browsing applications, voice-over-internet-protocol (VOIP) telephone call applications, email applications, media playback applications, operating system functions, power management functions for controlling when one or more processors wake up, game applications, maps, instant messaging applications, payment applications, calendar applications, notification/reminder applications, and so forth.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors such as an application processor, a central processing unit (CPU) or other processing circuitry.

Wireless power transmitting device 12 may be a stand-alone power adapter (e.g., a wireless charging mat or puck that includes power adapter circuitry), may be a wireless charging mat or puck that is coupled to a power adapter or other equipment by a cable, may be a battery-powered electronic device (cellular telephone, tablet computer, laptop computer, removable case, etc.), may be equipment that has been incorporated into furniture, a vehicle, or other system, or may be other wireless power transfer equipment. Illustrative configurations in which wireless power transmitting device 12 is a wireless charging puck or battery-powered electronic device are sometimes described herein as an example.

Wireless power receiving device 24 may be a portable electronic device such as a wristwatch, a cellular telephone, a laptop computer, a tablet computer, an accessory such as an earbud, a tablet computer input device such as a wireless tablet computer stylus (pencil), a battery case, or other electronic equipment. Wireless power transmitting device 12 may include one or more input-output devices 62 (e.g., input devices and/or output devices of the type described in connection with input-output devices 56) or input-output devices 62 may be omitted (e.g., to reduce device complexity). Wireless power transmitting device 12 may be coupled to a wall outlet (e.g., an alternating current power source), may have a battery for supplying power, and/or may have another source of power. Device 12 may have an alternating-current (AC) to direct-current (DC) power converter such as AC-DC power converter 14 for converting AC power from a wall outlet or other power source into DC power.

In some configurations, AC-DC power converter 14 may be provided in an enclosure (e.g., a power brick enclosure) that is separate from the enclosure of device 12 (e.g., a wireless charging puck enclosure or battery-powered electronic device enclosure) and a cable may be used to couple DC power from the power converter to device 12. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, battery-powered device, etc.) may have only a single coil. In other arrangements, wireless charging device 12 may have multiple coils (e.g., two or more coils, 5-10 coils, at least 10 coils, 10-30 coils, fewer than 35 coils, fewer than 25 coils, or other suitable number of coils).

As the AC currents pass through one or more coils 42, the coils 42 produce electromagnetic field signals 44 in response to the AC current signals. Electromagnetic field signals (sometimes referred to as wireless power signals) 44 can then induce a corresponding AC current to flow in one or more nearby receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic field 44) from coil 48 into DC voltage signals for powering loads in device 24 such powering application processors as well as charging a battery in the device. This principle of wireless power transfer can be referred to as the transmitting and receiving of wireless power signals.

The DC voltages produced by rectifier 50 can be used in powering an energy storage device such as battery 58 and can be used in powering other components in device 24. For example, device 24 may include input-output devices 56 such as a display, touch sensor, communications circuits, audio components, sensors, components that produce electromagnetic signals that are sensed by a touch sensor in tablet computer or other device with a touch sensor (e.g., to provide stylus input), and other components and these components may be powered by the DC voltages produced by rectifier 50, in combination with other available energy sources such as battery 58.

During wireless power transmission operations, circuitry 52 supplies AC drive signals such as AC current signals to one or more coils 42 at a given power transmission frequency. The power transmission frequency is sometimes referred to as a carrier frequency, power carrier frequency, drive frequency, or inverter switching frequency Fs. The inverter switching frequency Fs may be, for example, a predetermined frequency of about 125 kHz, about 128 kHz, about 200 kHz, about 326 kHz, about 360 kHz, at least 80 kHz, at least 100 kHz, less than 500 kHz, less than 300 kHz, or other suitable wireless power frequency. Devices operating under the Qi wireless charging standard established by the Wireless Power Consortium generally operate between 110-205 kHz or between 80-300 kHz. In some configurations, the switching frequency Fs is negotiated in communications between devices 12 and 24. In other configurations, the power transmission frequency can be fixed.

Control circuitry 16 may also include external object measurement circuitry 41 configured to detect external objects on a charging surface of device 12 and to make other desired measurements such as current measurements, voltage measurements, power measurements, and/or energy measurements. Measurement circuitry 41 can detect indications of objects abutting device 12. Measurement circuitry 41 can aid in the detection of whether a nearby object is compatible with wireless charging operations, or if the nearby object is likely a foreign object such as coils, paper clips, coins, and other generally metallic objects that react to inductive fields but incompatible with wireless charging.

Figure 1B:
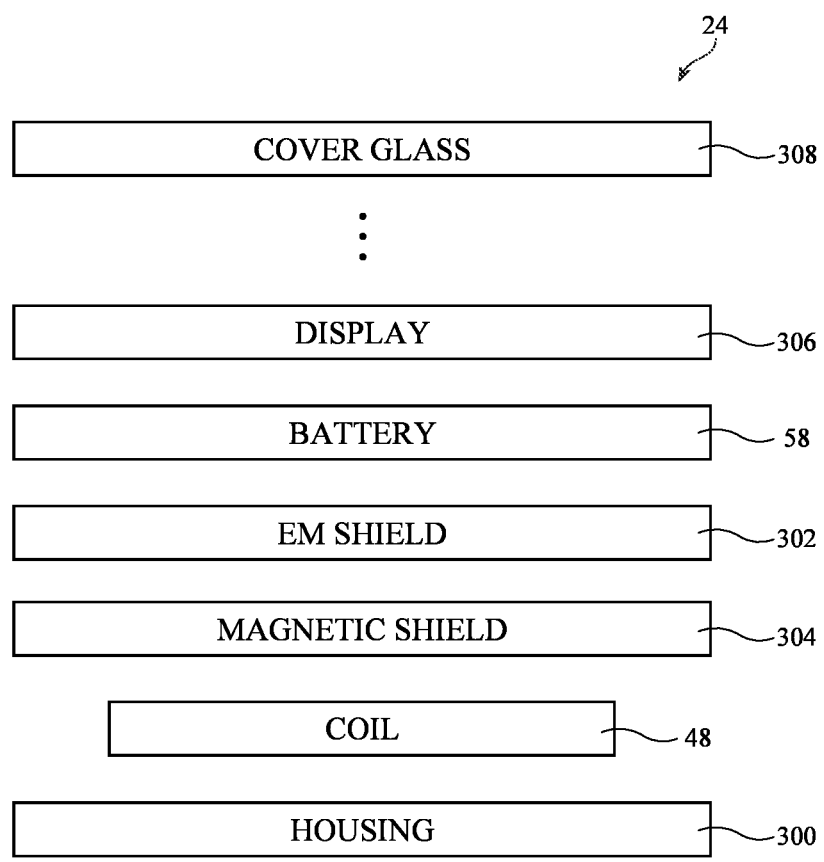
FIG. 1B is an exploded view of an illustrative wireless power receiving device in accordance with some embodiments.

FIG. 1B shows an exploded view of power receiving device 24. As shown in FIG. 1B, exemplary power receiving device 24 includes a device housing such as housing layer 300, wireless power coil 48, shielding layers 302 and 304, battery 58, display 306, and a cover layer such as cover glass 308 disposed over display 306. Device housing 300 and cover glass 308 serve as lower and upper external protective layers, respectively. Although not explicitly shown, additional components such as communications, storage, and processing components are included within the stack-up of device 24. The arrangements of components in a device such as device 24 may vary.

Electronic components within device 24 are subject to signal interference. Shielding layer 302 can be a metal shield configured to suppress electromagnetic interference. Shielding layer 302 of this type can be formed from materials such as copper, nickel, silver, gold, other metals, a combination of these materials, or other suitable conductive material that suppress signals at radio frequencies and may sometimes be referred to as radio-frequency shields or e-shields.

Shielding layer 304 directs magnetic fields at relatively lower frequencies to function as a guide for electromagnetic flux received from a wireless power transmitter. Layer 304 may be a layer of magnetic material that can serve as a magnetic shield (i.e., layer 304 can block magnetic flux and may have a relative permeability of 500 or more 1000 or more, or other suitable value). An example of a material that can be used in forming magnetic shielding layer 304 is ferrite. Another example of a material that can be used in forming magnetic shielding layer 304 is a high permeability nickel-iron magnetic alloy that is sometimes referred to as mu-metal or permalloy. Another example of a material that can be used in forming magnetic shielding layer 304 is an iron-based nano-crystalline material.

Figure 3:
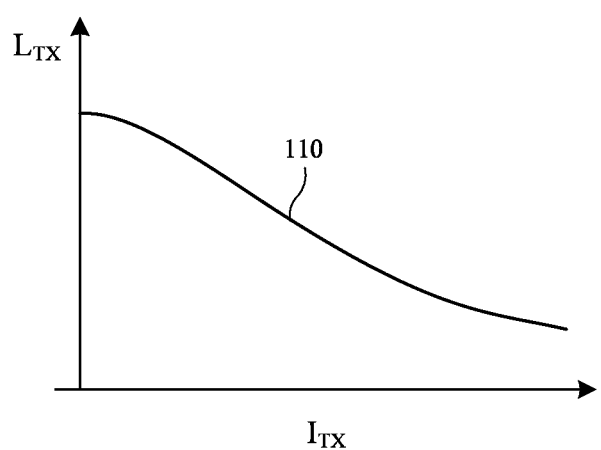
FIG. 3 is a plot showing a reduction in mated inductance caused by saturation in accordance with some embodiments.

In accordance with some embodiments, power transmitting device 12 can include one or more magnets that may contribute to certain characteristic conditions in a shielding structure within power receiving device 24. As shown in FIG. 1B, power receiving device 24 may include a shielding layer 304. During wireless power transmission, inverter 60 may drive AC current signals through coil 42. The AC current flowing through coil 42 induces AC magnetic flux that can add to the DC magnetic flux associated with the magnet within device 12. The combination of the AC and DC magnetic flux at the transmitting device 12 can result in a characteristic condition such as saturation at shield 304. Saturation occurs when an increase in applied magnetic field cannot further increase the magnetization of the material. Saturation can also occur at ferrite or nano-crystalline materials with high magnetic saturation or high AC flux. Saturation (e.g., magnetic saturation or magnetic flux saturation) can cause a reduction in the amount of mated inductance between devices 12 and 24, impacting wireless charging performance. FIG. 3 illustrates a reduction in mated inductance caused by saturation. FIG. 3 plots the mated inductance value $L_{TX}$ as a function of the current $I_{TX}$ flowing through wireless power transmitting coil 42. As shown by curve 110, a reduction in the mated inductance value resulting from saturation translates to an increase in current $I_{TX}$.

Figure 4:
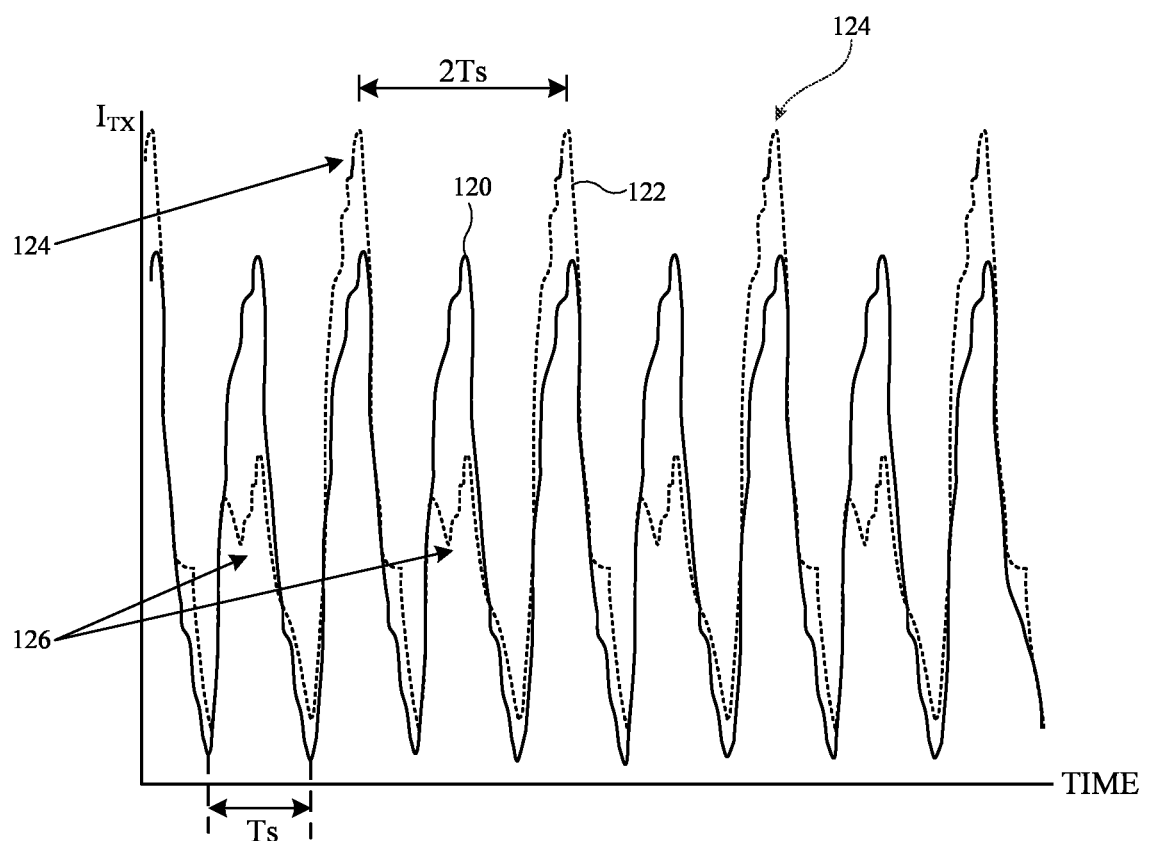
FIG. 4 is a timing diagram illustrating the behavior of a transmit coil current in a wireless power transmitting device with and without saturation in accordance with some embodiments.

FIG. 4 is a timing diagram illustrating the behavior of transmit coil current $I_{TX}$ with and without saturation. Waveform 120 represents the behavior of current $I_{TX}$ in the absence of saturation, whereas waveform 122 represents the behavior of current $I_{TX}$ in the presence of saturation. As shown in FIG. 4, waveform 120 toggles at an inverter switching frequency Fs with a period Ts that is equal to the inverse of Fs (e.g., duration Ts is equal to the reciprocal of the power carrier frequency). Waveform 120 has relatively stable peaks and valleys from cycle-to-cycle, which yields an expected energy level at the fundamental switching frequency Fs.

In contrast, waveform 122 exhibits much high peak current levels every other cycle (as shown by elevated peaks 124) as a result of the saturation and reduced mated inductance. Waveform 122 recovers to relatively lower peak current levels every other cycle (as shown by lowered peaks 126). Waveform 122 therefore exhibits significantly higher energy levels at half the switching frequency Fs/2 with a period 2*Ts. This phenomenon where higher energy levels are present at some fraction of the switching frequency Fs, particularly sub-harmonics of Fs, is indicative of saturation.

Figure 2:
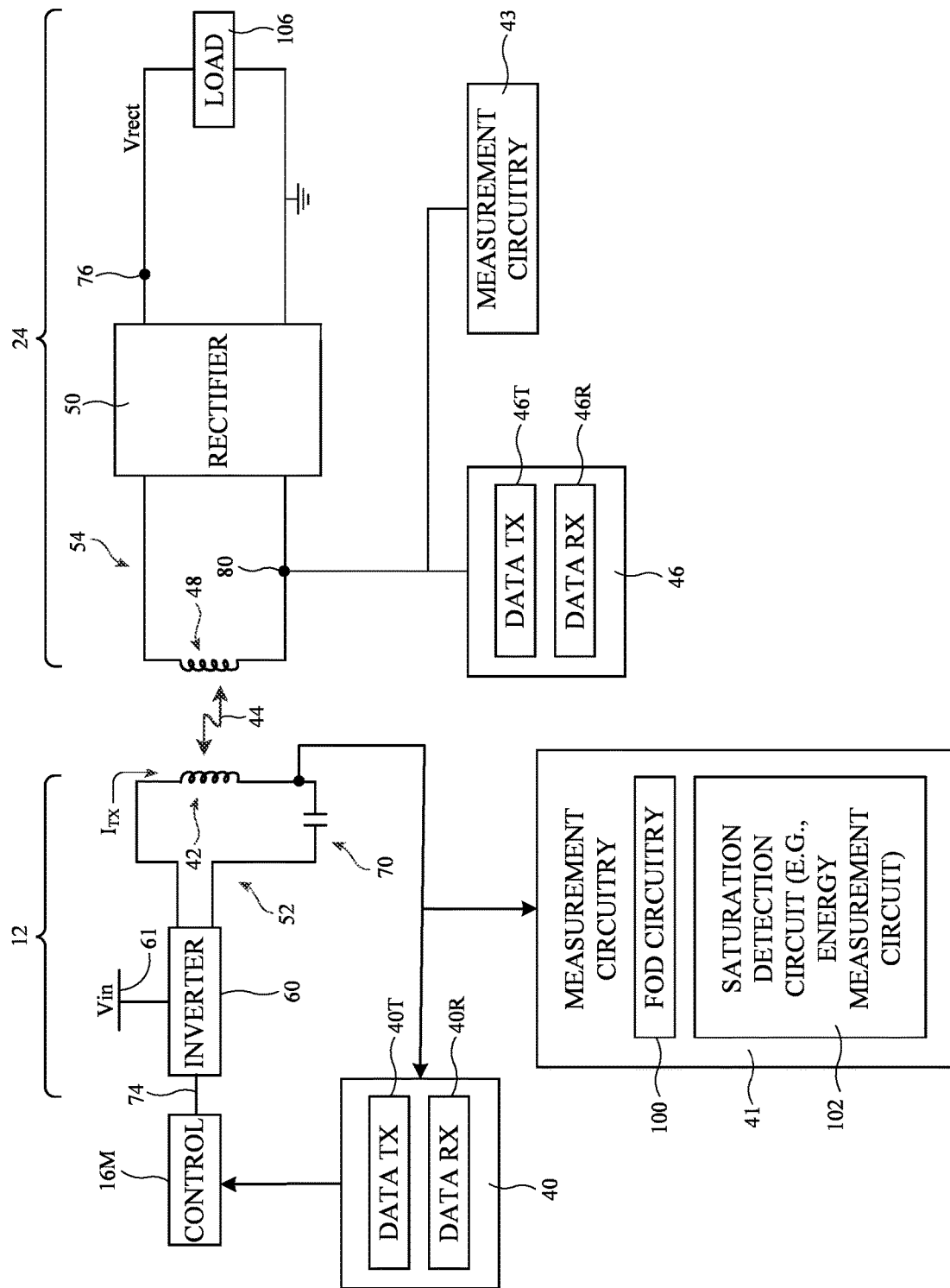
FIG. 2 is a circuit schematic of wireless power transmitting and receiving circuitry in accordance with some embodiments.

Referring back to FIG. 2, measurement circuitry 41 may include a foreign object detection (FOD) circuit such as FOD circuit 100 and/or a saturation detection circuit such as saturation detection circuit 102. Saturation detection circuit 102 may include an energy measurement circuit configured to measure a value representing energy levels in the resonant tank at various frequency bands to determine whether saturation and therefore oscillation have occurred. Saturation detection circuit 102 may also be configured to measure the DC voltage across capacitor 70. A non-zero DC voltage across capacitor 70 does not necessarily imply saturation, but saturation will result in a non-zero DC bias voltage across capacitor 70.

Ferrite or other magnetic saturation that can occur within power receiving device 24 and the resulting oscillations can potentially cause communications to fail between devices 12 and 24. As described above, oscillations occur when the transmitted electromagnetic flux becomes sufficiently high to induce saturation in power receiving device 24. In a typical wireless charging system, upon startup, the transmit power will start ramping up from a low power level to a target power level. As the transmit power level is ramped up, saturation (and characteristic oscillations) may occur. Saturation may also occur or re-appear after the power ramp up phase, for example if the wireless power receiver is moved relative to the wireless power transmitter during power transfer. This can also occur when certain environmental or operating condition such as temperature changes.

Figure 5:
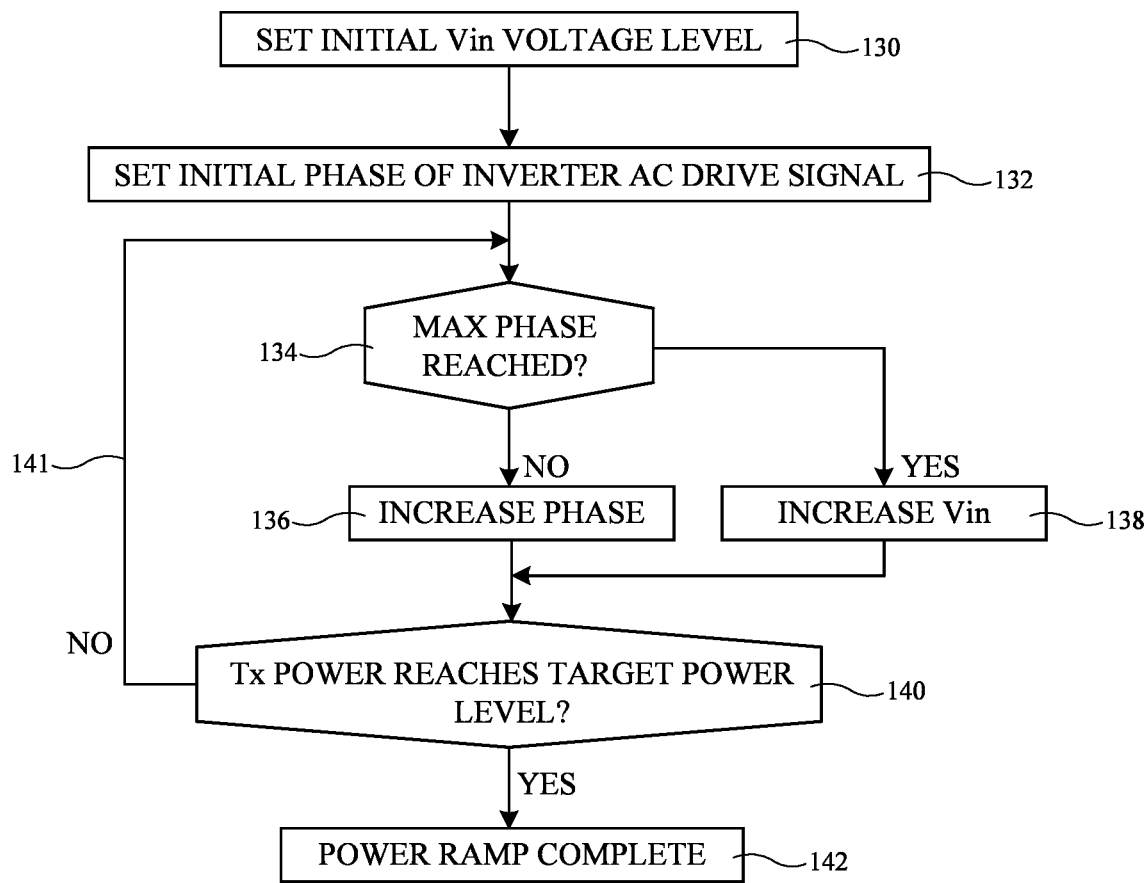
FIG. 5 is a flow chart of illustrative steps for performing power ramp up in accordance with some embodiments.

FIG. 5 is a flow chart of illustrative steps for performing power ramp up operations. At step 130, the inverter power supply voltage Vin may be set to an initial voltage level. As an example, voltage Vin may be initialized to 9 V. This is merely illustrative. The inverter supply voltage Vin may be initialized to 4 V, 5 V, 6 V, 7 V, 8 V, 10 V, 11 V, 1-10 V, or other starting voltage level.

At step 132, the phase of the AC drive signal output by inverter 60 may be set to an initial phase amount. As an example, the phase of the inverter AC drive signal may be set to 90 degrees. A 90° phase may translate to a 25% duty cycle. This is merely illustrative. The AC drive signal phase may be initialized to 45 degrees (e.g., a 12.5% duty cycle), to 60 degrees (e.g., a 16.7% duty cycle), to 120 degrees (e.g., 33.3% duty cycle), to 135 degrees (e.g., 37.5% duty cycle), to 80-100 degrees, 70-110 degrees, 60-120 degrees, or other starting phase amount.

At step 134, the control circuitry such as controller 16M may determine whether the max phase has been reached. The control circuitry may compare the current phase level to the maximum phase level. As an example, the maximum phase level may be set to 180 degrees, which translates to a 50% duty cycle. This is merely illustrative. The maximum phase may be set to 160 degrees, 170 degrees, 190 degrees, 200 degrees, less than 180 degrees, more than 180 degrees, 120-180 degrees, 180-360 degrees, 170-190 degrees, 160-200 degrees, 150-210 degrees, 140-220 degrees, or other maximum phase amount.

If the maximum phase has not been reached (i.e., if the current phase is equal to the maximum phase limit), the control circuitry will increase the phase of the AC drive signal by a phase step amount at block 136. The phase step amount may be 5 degrees, 10 degrees, 15 degrees, 20 degrees, or other phase delta. The inverter AC drive signal phase can be increased by increasing the duty cycle of the AC drive signal. If the maximum has been reached (i.e., if the current phase is equal to or greater than the maximum phase limit), the control circuitry will increase the inverter supply voltage Vin by a voltage step amount at block 138. The voltage step amount may be 1 V, 0.5 V, 2 V, 1.5 V, 0.1 V, 0.2 V 0.3 V, 0.1-2 V, or other voltage delta.

At step 140, the control circuitry will determine whether the transmit power level has reached the target power level. The target power level may be 12 V, 13 V, 14 V, 15 V, 16 V, 17 V, 18 V, 9-18 V, equal to or greater than 12 V, equal to or greater than 18 V, or other target power level. If the target power level has not been reached, processing may loop back to step 134 as indicated by path 141. If the target power level has been reached, the power ramping is complete (step 142).

Figure 6:
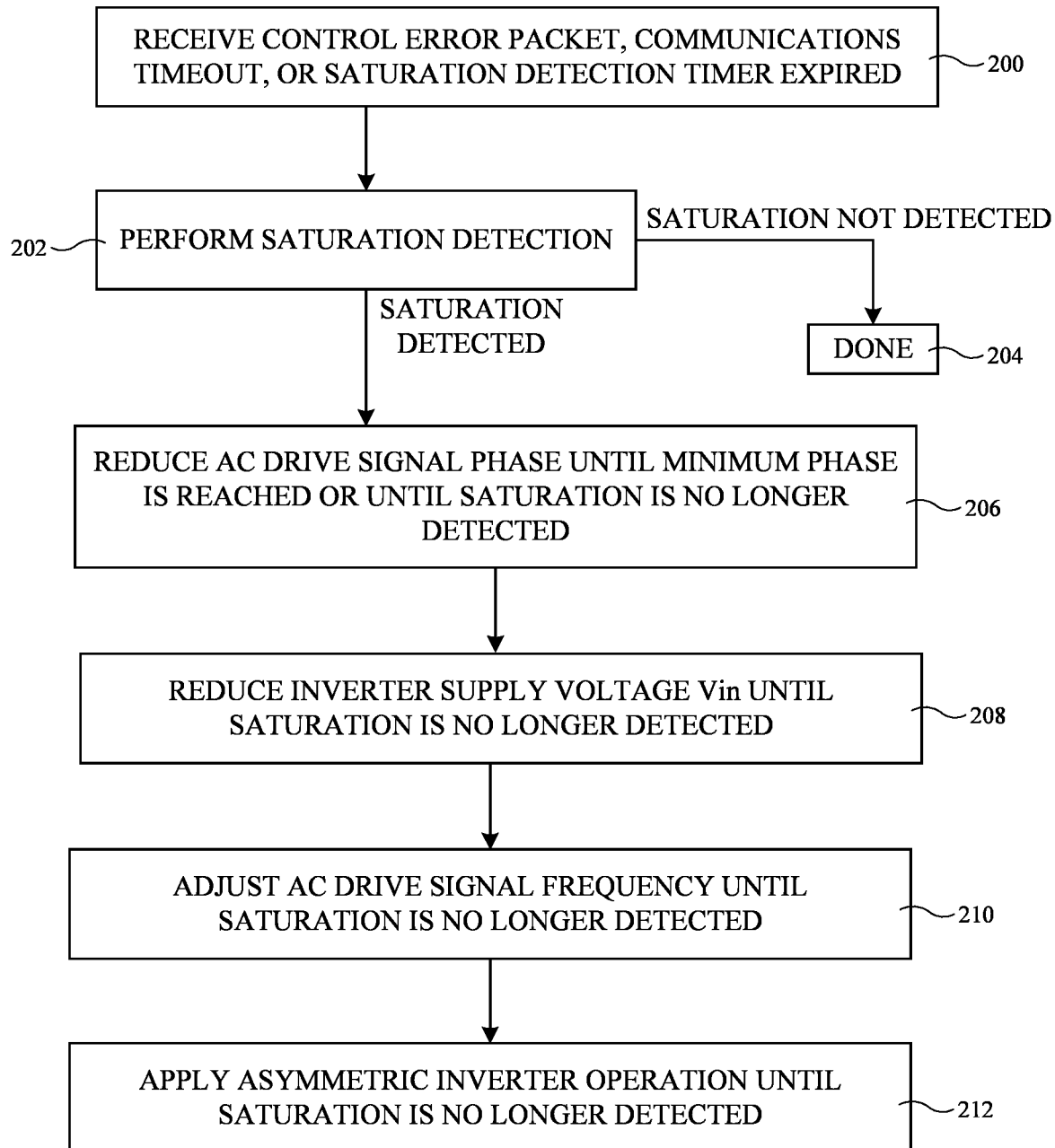
FIG. 6 is a flow chart of illustrative steps for performing saturation detection and mitigation in accordance with some embodiments.

As described above, saturation can occur during the power ramp up phase or after the power ramp up phase. In accordance with some embodiments, control circuitry 16 within power transmitting device 12 (see, e.g., FIG. 1) can be used to perform saturation detection and mitigation during the power ramp up phase and/or after the power ramp up phase. If no oscillation is detected during the power ramp up phase, then device 12 can continue to ramp up its power level. FIG. 6 is a flow chart of illustrative steps for performing saturation detection and mitigation operations.

At step 200, data receiver 40R may receive a control error packet (CEP), the communications between devices 12 and 24 may time out, or a saturation detection timer may expire. The Qi mechanism for controlling the transmit power level uses power receiving device 24 to send to power transmitting device 12 power adjustment requests such as ASK modulated packets sometimes referred to as a control error packet (CEP). Control circuitry 16 may include a saturation detection timer that expires to trigger a corresponding saturation detection operation. The saturation detection timer can be started periodically or in response to certain events such as the start of the power ramp up phase.

In response to power transmitting device 12 receiving a control error packet from power receiving device 24, in response to a communications time out event, or in response to the saturation detection timer expiring, saturation detection circuit 102 (see, e.g., FIG. 2) may be configured to perform saturation detection operations at step 202. Various saturation detection schemes can be used.

As an example, saturation detection circuit 102 can include a measurement circuit configured to measure an energy level of the resonant tank or a value representing the energy level such as a measured current level or a measured voltage level at a measurement frequency that is equal to half the inverter switching frequency (e.g., the measurement frequency may be equal to Fs/2). Measurement circuit 102 is therefore sometimes referred to as an energy measurement circuit. The energy measurement circuit may be a frequency selective energy computation block having a bandpass filter followed by an energy integrator (as an example). As another example, the energy measurement circuit may include a fast Fourier transform (FFT) block. Saturation detection circuit 102 may compare the measured value to a threshold.

The threshold may be equal to one percent of an energy level or another value representing the energy level of the resonant tank at switching frequency Fs. The energy level at frequency Fs can be an anticipated amount of energy generated by the AC drive signal at the output of inverter 60 in the absence of saturation (e.g., the expected energy level at Fs generated by waveform 120 in FIG. 4). The anticipated (expected) amount of energy can be predetermined using simulation or experimentally. The energy level at switching frequency Fs can also be measured in real time using measurement circuit 102 (e.g., by tuning the bandpass filter to Fs). This 1% threshold is merely illustrative. In other embodiments, the threshold may be equal to 0.1% of the expected/measured energy level at Fs, 0.1-1.0% of the expected/measured energy level at Fs, 2% of the expected/measured energy level at Fs, 1-5% of the expected/measured energy level at Fs, 1-10% of the expected/measured energy level at Fs, less than 1% of the expected/measured energy level at Fs, more than 1% of the expected/measured energy level at Fs, or other desired fraction of the energy level at Fs. If the measured value exceeds the threshold, then saturation has been detected. If the measured value does not exceed the threshold, then saturation has not been detected and saturation detection terminates (at step 204).

The example above in which the measurement circuit measures the energy level (or some value representing the energy level) at Fs/2 is merely illustrative. As another example, the measurement circuit might measure an energy-representative value at Fs/3. As another example, the measurement circuit might measure an energy-representative value at 2*Fs/3. As another example, the measurement circuit might measure an energy-representative value at Fs/4. As another example, the measurement circuit might measure an energy-representative value at 3*Fs/4. In general, saturation detection circuit 102 can be configured to measure an energy-representative value (e.g., a measured current value or a measured voltage value) at any suitable sub-harmonic range or fraction of switching frequency Fs.

The example above in which the energy measurement circuit measures a value representing the energy level at some fraction of switching frequency Fs is merely illustrative. As shown in FIG. 3, the lower peaks 126 of waveform 122 showing saturation can excite energy at the even harmonics. Thus, the measurement circuit might measure the energy level at 2*Fs, 4*Fs, 6*Fs, and so on and compare the measured energy level to some threshold that is some fraction of the expected energy level at Fs. If desired, the saturation detection circuit 102 can be configured to measure the energy level at odd harmonics of the switching frequency (e.g., 3*Fs, 5*Fs, 7*Fs, and so on).

The examples above in which the saturation detection circuit 102 measures energy levels in various frequency sub-bands is merely illustrative. In other embodiments, circuit 102 can perform saturation detection in the time domain. For example, saturation detection circuit 102 may measure the peak to peak variation over N≥2 cycles and compare the peak measured during one cycle to the peak measured during a subsequent cycle (e.g., by computing a ratio of the peak values measured from at least two consecutive cycles). Saturation detection circuit 102 may monitor peak-to-peak current, peak-to-peak voltage, and/or peak-to-peak power levels.

As shown in FIG. 4, the peak-to-valley variation in waveform 122 can be fairly large from one cycle to another when saturation is present. For instance, a first delta value can be obtained by computing the difference between the peak and valley during a first cycle, whereas a second delta value can be obtained by computing the difference between the peak and valley during a second cycle following the first cycle. If the maximum delta value or if the variance of the two delta values over N cycles exceeds a delta threshold level, then saturation is detected. If the maximum delta value or if the variance of the two delta values over N consecutive cycles does not exceed the delta threshold level, then saturation has not been detected and saturation detection terminates (at step 204). This time domain peak-to-peak variation can also be computed by applying a smoothing filter (e.g., using a sliding average window). The threshold level used during time domain saturation detection may be a deterministic threshold value that is identified experimentally or via simulation.

The examples above in which the saturation detection circuit 102 measures energy levels at one or more frequencies is merely illustrative. As another example, measurement circuitry 41 may use a separate indicator of lost energy as a proxy for saturation. Saturation can lead to excessive energy losses, which can inadvertently trigger FOD and can lead to shut down. To prevent FOD from being inadvertently triggered, a blanking timer may be used to temporality deactivate FOD circuit 100 during the power ramp up phase or during saturation detection operations. As yet another example, measurement circuitry 41 may be configured to measure the DC bias voltage across the series capacitor (see capacitor 70 in FIG. 2). When saturation occurs, a non-zero bias voltage is seen across the series capacitor.

In the example of FIG. 6, M contiguous positive saturation detections may be required at step 202 before proceeding with the saturation mitigation operations. M may be equal to one, two, three, four, five, 1-5, more than one, more than five, 5-10, or other integer. Higher M values can help filter out potentially noisy saturation measurements and prevent false positive saturation detection.

If saturation is detected, various saturation mitigation operations can be performed (see, e.g., steps 206, 208, 210, and/or 212 in FIG. 6). At step 206, the control circuitry may reduce the phase (e.g., the duty cycle) of the AC drive signal until a minimum phase is reached or until saturation is no longer detected. The minimum phase may be equal to 70 degrees, less than 70 degrees, more than 70 degrees, 60-80 degrees, 50-90 degrees, or other phase amount. For example, the control circuitry may decrease the phase by 5° and re-perform saturation detection to check whether saturation has been mitigated. The 5° step size is merely illustrative. If desired, a phase step size of less than 5°, more than 5°, 1-5°, 5-10°, 1-10°, or other phase delta can be used. If desired, phase may decrease more rapidly at higher phase levels and decrease more gradually at lower phase levels. Once saturation is no longer detected, saturation mitigation operations are complete.

If the minimum phase has been reached but saturation is still present, the control circuitry may reduce the inverter supply voltage Vin until saturation is no longer detected (step 208). For example, the control circuitry may decrease voltage Vin by 200 mV and re-perform saturation detection to check whether saturation has subsided. The 200 mV step size is merely illustrative. If desired, a voltage step size of 10 mV, 50 mV, 100 mV, 300 mV, 10-300 mV, 190-210 mV, 180-220 mV, 150-250 mV, 100-300 mV, or other voltage delta can be used. Once saturation is no longer detected, saturation mitigation operations can be terminated.

As another example, the control circuitry can optionally adjust the switching frequency of the AC drive signal until saturation is no longer detected (step 210). Adjusting the switching frequency (e.g., increasing or decreasing Fs) can reduce the coupling gain as well as the half-cycle period, which can help limit the increase in the transmit coil current and thus prevent saturation. It is also possible to change power transmission levels to detect if power transmission wattage levels affect saturation. For example, the Qi standard allows for different power profiles. In some implementations a wireless power transmitter may account for saturation in determining whether to operate under, for example, base or extended power profiles.

Figure 7:
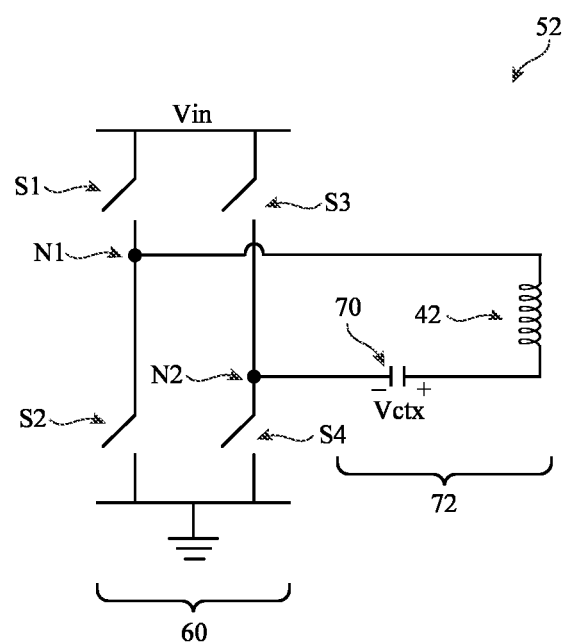
FIG. 7 is a circuit diagram of an inverter driving a resonant circuit in accordance with some embodiments.

As another example, the control circuitry can optionally operate inverter 60 using an asymmetric switching scheme to mitigate saturation (step 212). FIG. 7 shows inverter 60 driving a resonant tank circuit 72 having coil 42 connected in series with capacitor 70. As shown in FIG. 7, inverter 60 (e.g., a full-bridge inverter) may include switches S1 and S2 coupled in series between the Vin supply and ground and may include switches S3 and S4 coupled in series between the Vin supply and ground. Resonant tank has one terminal that is connected to a first switch node N1 interposed between inverter switches S1 and S2 and has another terminal that is connected to a second switch node N2 interposed between inverter switches S3 and S4.

Figure 8A:
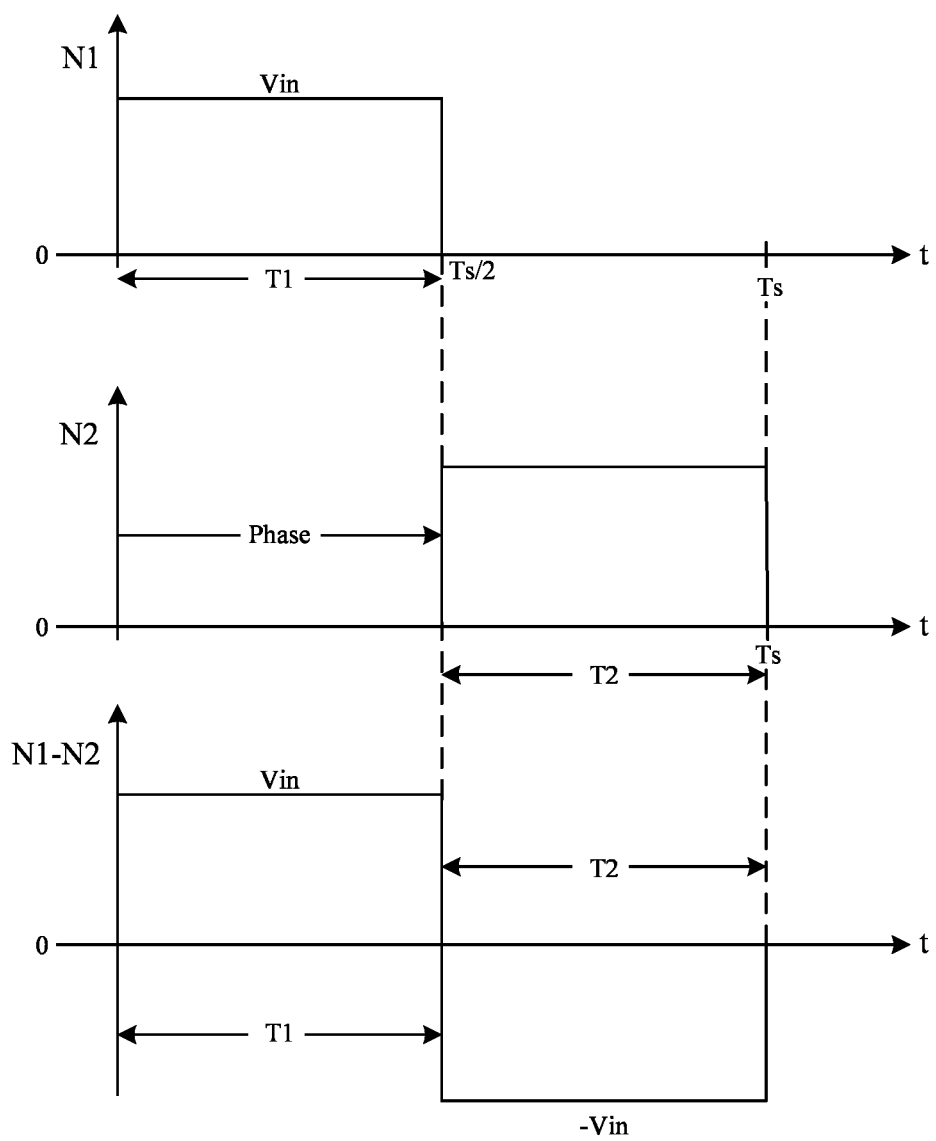
FIG. 8A is a timing diagram showing an inverter output with a 180° phase shift and a symmetric switching duty cycle in accordance with some embodiments.

FIG. 8A is a timing diagram illustrating an inverter output behavior with a 180° phase shift and a symmetric switching duty cycle. As shown in FIG. 8A, node N1 is driven high to supply voltage Vin for a duration T1 that is equal to half the inverter switching period Ts/2. The time delay between the rising edge of N1 and the rising edge of N2 is defined as the phase shift and is equal to 180° in this example. After the 180° phase delay, node N2 is driven high to supply voltage Vin for a duration T2 that is equal to Ts/2. The third waveform shows the result of N1 minus N2, which is the driving voltage applied to resonant tank 72. The result is a positive Vin for duration T1 followed by a negative Vin for duration T2. FIG. 8A shows how both N1 and N2 have equal durations, thus resulting in a symmetrical switching waveform (symmetrical duty cycle) on N1 minus N2 where the duration of +Vin is equal to the duration of −Vin.

A symmetrical excitation by the inverter typically results in a symmetric resonance waveform. In particular, the voltage waveform across series capacitor 70 will be symmetrical in the two half switching periods and average out to zero. However, if the ferrite structure or other magnetically permeable material in device 24 is saturated by nearby DC magnets, the permeability of such material will decrease as the resonant current moves in one direction and increase the resonant current moves in the other direction. This causes a resonant inductance value that is different in the two half switching periods. If hypothetically the voltage across capacitor 70 initially remains symmetrical in the two half switching periods, the voltage across coil 42 would remain symmetrical in the two half switching periods, thus the varying inductance of coil 42 would cause unequal currents in the two half switching periods. The unequal currents would move capacitor 70's average voltage away from zero. A new equilibrium state will be established when the voltage across capacitor 70 (sometimes referred to herein as Vctx) reaches an average voltage level (sometimes referred herein as DC bias) that restores the charge balance condition for capacitor 70. As a result, magnetic saturation (e.g., ferrite saturation) causes a DC bias in Vctx even though the inverter excitation is symmetrical.

In accordance with an embodiment, removing such DC bias in Vctx can help remove oscillation caused by saturation. A non-zero DC bias in Vctx, as detected using measurement circuitry 41 (see FIG. 2), can trigger a feedback control mechanism that adjusts inverter 60 in a way that drives the average Vctx towards zero. As an example, in response to using measurement circuitry 41 to detect a non-zero DC bias in Vctx, control circuitry 16M (see FIG. 2) can adjust inverter 60 to reduce the duty cycle of the AC drive signals output by inverter 60. Reducing the duty cycle of the inverter output signals can help drive average Vctx towards zero to help mitigate saturation. Other ways of adjusting inverter 60 to reduce average Vctx can also be used.

Figure 8B:
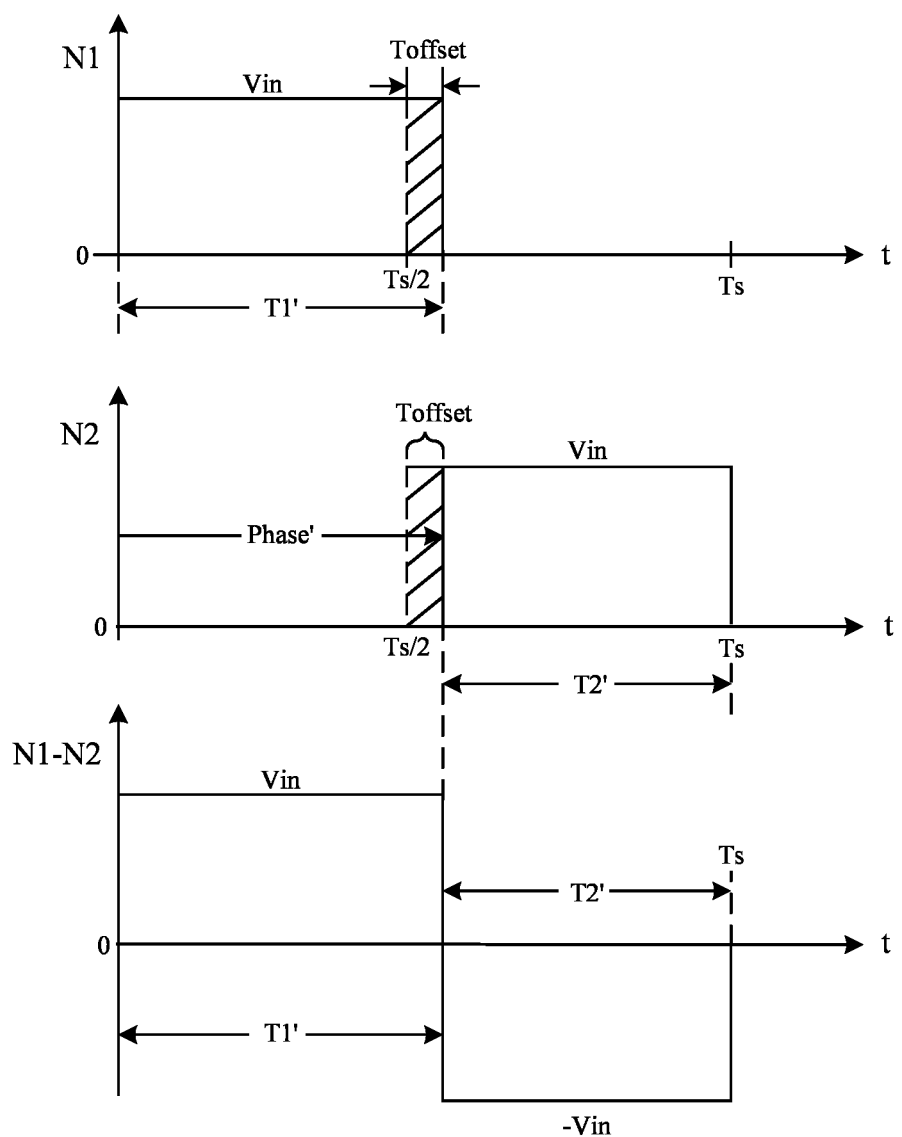
FIG. 8B is a timing diagram showing an inverter output with a 180° phase shift and an asymmetric duty cycle in accordance with some embodiments.

As another example, the unwanted DC bias in Vctx can be removed by applying opposite offsets to the duty cycles of nodes N1 and N2. FIG. 8B is a timing diagram showing an inverter output with a 180° phase shift and an asymmetric switching duty cycle. Compared to FIG. 8A, node N1 is driven high to supply Vin for a modified duration T1' that is lengthened by offset Toffset while node N2 is driven high (after a phase shift Phase') to supply Vin for a modified duration T2' that is shortened by offset Toffset. The phase shift time of node N2 (as denoted by Phase') effectively becomes (Ts/2+Toffset). Here, Toffset is shown as a positive value, but Toffset can also be a negative value. This results in a different waveform (e.g., N1 minus N2) having a +Vin for duration T1' and −Vin for duration T2'. This behavior in which the duty cycle of nodes N1 and N2 are different is sometimes referred to herein as an inverter switching operation with an asymmetric duty cycle.

Figure 8C:
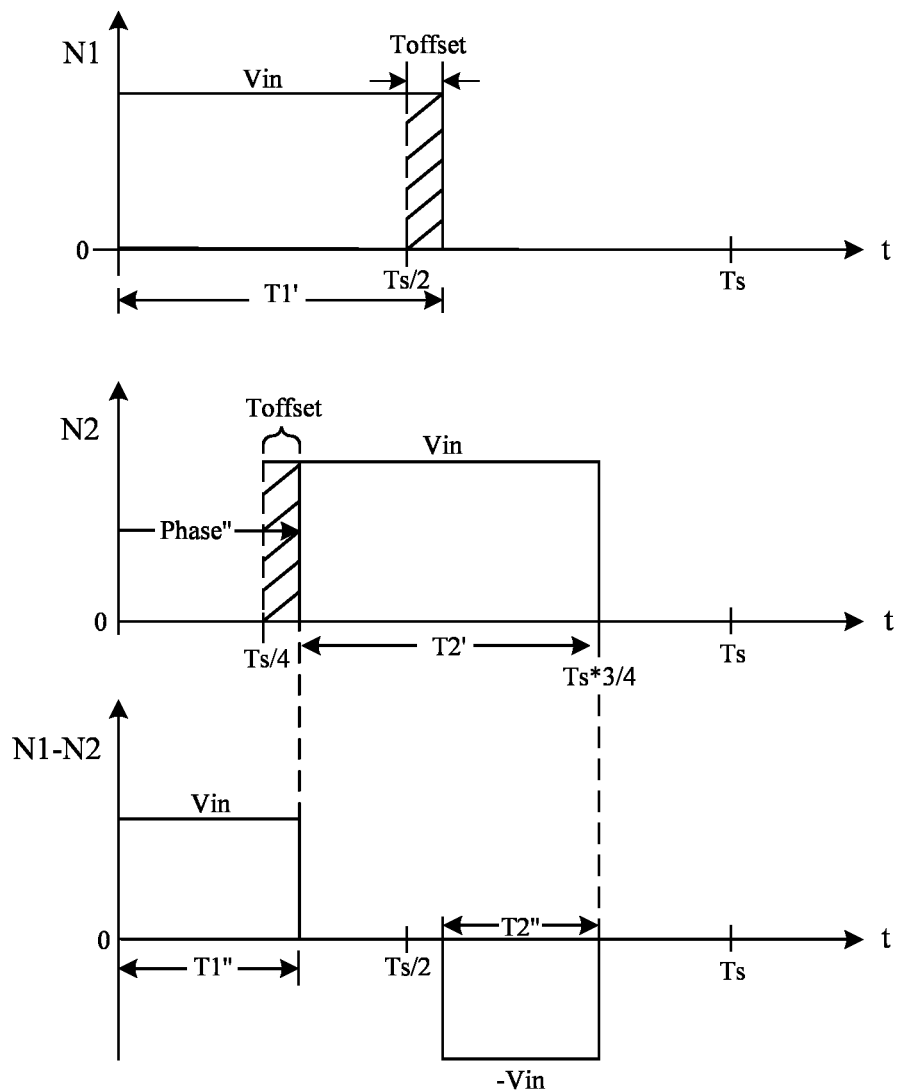
FIG. 8C is a timing diagram showing an inverter output with a 90° phase shift and an asymmetric duty cycle in accordance with some embodiments.

FIG. 8C is a timing diagram showing an inverter output with a 90° phase shift and an asymmetric switching duty cycle. Compared to FIG. 8B, node N1 is driven high to supply Vin for a modified duration T1' that is lengthened by offset Toffset while node N2 is driven high (after a phase shift Phase") to supply Vin for a modified duration T2' that is again shortened by offset Toffset. The phase shift time of node N2 (as denoted by Phase") effectively becomes (Ts/4+Toffset). Here, Toffset is shown as a positive value, but Toffset can also be a negative value. This results in a different waveform (e.g., N1 minus N2) having a +Vin for duration T1" and −Vin for duration T2". This behavior in which the duty cycle of nodes N1 and N2 are different is sometimes referred to herein as an inverter switching operation with asymmetric duty cycle.

The offset Toffset can be computed by a compensator block within control circuitry 16 (FIG. 1), taking the Vctx DC bias value as a negative feedback input. When the DC bias is negative (as defined by the Vctx polarity shown in FIG. 7), the offset will be a positive value that lengthens T1 while shortening T2. When the DC bias is positive, the offset will be a negative value that shortens T1 while lengthening T2. This compensator block can take various forms, such as a proportional-integral-derivative (PID) controller, a proportional-integral (PI) controller, or a simple integrator. The compensator block should include an integral component as the saturation mitigation loop needs to retain a Toffset value even when the DC bias is driven to zero.

As shown in the example of FIG. 6, the phase is decreased until some minimum phase amount and then voltage Vin is reduced. As another example, the control circuitry may lock or fix the voltage level of Vin as soon as saturation is detected. This prevents the supply voltage Vin from further increasing, thereby attenuating one of the causes of saturation. The examples herein for mitigating saturation in response to detecting saturation caused by saturation is merely illustrative. In general, the various embodiments for mitigating saturation can also be applied in response to detecting when a magnetically permeable material exceeds its magnetic saturation level.

The foregoing is merely illustrative and various modifications can be made to the described embodiments. The foregoing embodiments may be implemented individually or in any combination.

The invention claimed is:

1. Control circuity for a wireless power transmitter comprising:

communication circuitry configured to be coupled to a wireless power transmitting coil of the wireless power transmitter, the communication circuitry being further configured to receive communication from a wireless power receiver via modulation by the wireless power receiver of one or more parameters of the wirelessly transferred power;

measurement circuitry configured to be coupled to the wireless power transmitting coil and configured to detect saturation of a magnetic core of the wireless power receiver, wherein the measurement circuitry is configured to detect saturation of the magnetic core by reference to a DC voltage across a resonant capacitor coupled to the wireless power transmitting coil; and inverter drive circuitry configured to operate an inverter of the wireless power transmitter responsive to the measurement circuitry to mitigate detected saturation of the magnetic core by driving the DC voltage across the resonant capacitor to zero.

2. The control circuitry of claim 1 wherein the inverter drive circuitry is further configured to operate the inverter responsive to the communication circuitry to deliver a power level requested by the wireless power receiver.

3. The control circuitry of claim 1 wherein the inverter drive circuitry is configured to operate the inverter responsive to the measurement circuitry to mitigate detected saturation of the magnetic core by reducing output power of the inverter.

4. The control circuitry of claim 3 wherein reducing output power of the inverter comprises
reducing a phase of a drive signal provided to the inverter.

5. The control circuitry of claim 3 wherein reducing output power of the inverter comprises reducing an inverter supply voltage.

6. The control circuitry of claim 3 wherein reducing output power of the inverter comprises operating the inverter with an asymmetric switching scheme.

7. The control circuitry of claim 6 wherein the asymmetric switching scheme includes reducing an on-time of a positive half cycle.

8. The control circuitry of claim 1 wherein the inverter drive circuitry is configured to operate the inverter responsive to the measurement circuitry to mitigate detected saturation of the magnetic core by reducing a duty cycle of AC drive signals output by the inverter.

9. The control circuitry of claim 1 wherein the inverter drive circuitry is configured to operate the inverter responsive to the measurement circuitry to mitigate detected saturation of the magnetic core by applying opposite offsets to duty cycles of respective nodes of the inverter.

10. The control circuitry of claim 1 wherein the measurement circuitry detects saturation of the magnetic core only in response to multiple consecutive saturation detection events.

11. A method of operating a wireless power transmitter having a resonant tank including a wireless power transmitting coil and a capacitor, an inverter that drives the resonant tank at a wireless power transfer frequency to transfer power to a wireless power receiver via a wireless power receiving coil of the wireless power receiver, and control circuitry, the method being performed by the control circuitry and comprising:

receiving communication from the wireless power receiver via communication circuitry coupled to the wireless power transmitting coil that detects modulation by the wireless power receiver of one or more parameters of the wirelessly transferred power;

detecting saturation of a magnetic core of the wireless power receiving coil using measurement circuitry coupled to the wireless power transmitting coil, wherein detecting saturation of a magnetic core of the wireless power receiving coil using measurement circuitry coupled to the wireless power transmitting coil further comprises detecting saturation of the magnetic core by using DC voltage across the capacitor; and operating the inverter using inverter drive circuitry responsive to the measurement circuitry to mitigate detected saturation of the magnetic core by driving the DC voltage across the capacitor to zero.

12. The method of claim 11 further comprising operating the inverter using inverter drive circuitry responsive to the communication circuitry to deliver a power level requested by the wireless power receiver.

13. The method of claim 11 wherein operating the inverter drive circuitry responsive to the measurement circuitry to mitigate detected saturation of the magnetic core comprises reducing output power of the inverter.

14. The method of claim 13 wherein reducing output power of the inverter further comprises
reducing a phase of a drive signal provided to the inverter.

15. The method of claim 13 wherein reducing output power of the inverter further comprises reducing an inverter supply voltage.

16. The method of claim 13 wherein reducing output power of the inverter further comprises operating the inverter with an asymmetric switching scheme.

17. The method of claim 16 wherein operating the inverter with the asymmetric switching scheme includes reducing an on-time of a positive half cycle.

18. The method of claim 11 wherein operating the inverter using inverter drive circuitry responsive to the measurement circuitry to mitigate detected saturation of the magnetic core by driving the DC voltage across the capacitor to zero further comprises reducing a duty cycle of AC drive signals output by the inverter.

19. The method of claim 11 wherein operating the inverter using inverter drive circuitry responsive to the measurement circuitry to mitigate detected saturation of the magnetic core by driving the DC voltage across the capacitor to zero further comprises applying opposite offsets to duty cycles of respective nodes of the inverter.

20. The method of claim 11 further comprising detecting saturation of the magnetic core only in response to multiple consecutive saturation detection events.

21. A wireless power transmitter comprising:
a resonant tank comprising a wireless power transmitting coil and a capacitor;
an inverter that drives the resonant tank at a wireless power transfer frequency to transfer power to a wireless power receiver via a wireless power receiving coil of the wireless power receiver;
control circuitry further comprising:
communication circuitry coupled to the wireless power transmitting coil configured to receive communication from the wireless power receiver via modulation by the wireless power receiver of one or more parameters of the wirelessly transferred power;
measurement circuitry coupled to the wireless power transmitting coil that detects saturation of a magnetic core of the wireless power receiving coil, wherein the measurement circuitry detects saturation of the magnetic core of the wireless power receiving coil by reference to a DC voltage across the capacitor; and
inverter drive circuitry that operates the inverter responsive to the measurement circuitry to mitigate detected saturation of the magnetic core by driving the DC voltage across the capacitor to zero.

22. The wireless power transmitter of claim 21 wherein the inverter drive circuitry further operates the inverter responsive to the communication circuitry to deliver a power level requested by the wireless power receiver.

23. The wireless power transmitter of claim 21 wherein the inverter drive circuitry operates the inverter responsive to the measurement circuitry to mitigate detected saturation of the magnetic core by reducing output power of the inverter.

24. The wireless power transmitter of claim 23 wherein reducing output power of the inverter comprises at least one of
reducing a phase of a drive signal provided to the inverter.

25. The wireless power transmitter of claim 23 wherein reducing output power of the inverter comprises at least one of reducing an inverter supply voltage.

26. The wireless power transmitter of claim 23 wherein reducing output power of the inverter comprises operating the inverter with an asymmetric switching scheme.

27. The wireless power transmitter of claim 26 wherein the asymmetric switching scheme includes reducing an on-time of a positive half cycle.

28. The wireless power transmitter of claim 21 wherein the inverter drive circuitry operates the inverter responsive to the measurement circuitry to mitigate detected saturation of the magnetic core by reducing a duty cycle of AC drive signals output by the inverter.

29. The wireless power transmitter of claim 21 wherein the inverter drive circuitry operates the inverter responsive to the measurement circuitry to mitigate detected saturation of the magnetic core by applying opposite offsets to duty cycles of respective nodes of the inverter.

30. The wireless power transmitter of claim 21 wherein the measurement circuitry detects saturation of the magnetic core only in response to multiple consecutive saturation detection events.

* * * * *